US009386098B2

(12) United States Patent
Reed et al.

(10) Patent No.: US 9,386,098 B2
(45) Date of Patent: Jul. 5, 2016

(54) SMARTPHONE MANAGEMENT SYSTEM AND METHOD (75) Inventors: Robert F. Reed, El Dorado Hills, CA (US); Kevin R. Allan, San Jose, CA (US)

(73) Assignee: FIDELITHON SYSTEMS, LLC, San Jose, CA (US)

( * ) Notice: Subject to any disclaimer, the term of this patent is extended or adjusted under 35 U.S.C. 154(b) by 0 days.

(21) Appl. No.: 13/151,603

(22) Filed: Jun. 2, 2011

(65) Prior Publication Data

US 2011/0306326 A1    Dec. 15, 2011

Related U.S. Application Data (60) Provisional application No. 61/353,769, filed on Jun. 11, 2010.

(51) Int. Cl.
*H04L 29/08* (2006.01)
*G06F 11/14* (2006.01)

(52) U.S. Cl.
CPC ........ *H04L 67/1097* (2013.01); *G06F 11/1461* (2013.01); *G06F 11/1464* (2013.01); *H04L 67/04* (2013.01); *G06F 11/1469* (2013.01); *H04L 67/06* (2013.01); *H04L 67/1095* (2013.01)

(58) Field of Classification Search
CPC ............ G06F 11/1456; G06F 11/1469; G06F 11/1448; G06F 11/1451; G06F 17/30132; G06F 2201/81; G06F 11/0754; G06F 17/30162; G06F 9/505; H04W 8/005; H04W 8/26; H04W 4/00; H04W 4/003; H04W 4/02

USPC ............... 455/411, 410, 414.4, 419, 418, 466
See application file for complete search history.

(56) References Cited

U.S. PATENT DOCUMENTS 8,255,006 B1 * 8/2012 Chavez et al. ................ 455/567
2003/0182301 A1    9/2003 Patterson et al.
(Continued)

FOREIGN PATENT DOCUMENTS

EP         1760593      3/2007
WO       2009055174    4/2009

OTHER PUBLICATIONS

International Search Report dated Feb. 9, 2012 corresponding to PCT/US11/039266.
(Continued)

*Primary Examiner* — Kwasi Karikari
(74) *Attorney, Agent, or Firm* — Peter Su; Dentons US LLP (57) ABSTRACT A mobile device management system is described for managing files that are locally generated or stored on the mobile device in a cloud environment. The mobile device is configured with a phone application module, a menu module, and a web browser module to conduct a backup operation of the files on the mobile device to a cloud through a network. The cloud comprises a web server, an authentication server, and a secure storage for authenticating the mobile user's access to the cloud, and provide a secure connection to backup the files from the mobile device to the secure storage of the cloud. The mobile device can also upload the files from the mobile device to secure storage of the cloud, which alleviates the burden of carrying a large amount of files on the file storage of the mobile device. In the upload operation, the mobile device deletes the files that have been uploaded to the cloud.

1 Claim, 7 Drawing Sheets

(56) References Cited

U.S. PATENT DOCUMENTS

| | | |
|---|---|---|
| 2004/0224665 A1 | 11/2004 | Kokubo |
| 2005/0191998 A1 | 9/2005 | Onyon |
| 2006/0111083 A1 | 5/2006 | Goss |
| 2007/0021112 A1* | 1/2007 | Byrne et al. .................. 455/419 |
| 2008/0043696 A1* | 2/2008 | Yang et al. .................... 370/341 |
| 2008/0208617 A1* | 8/2008 | Onyon et al. ..................... 705/1 |
| 2009/0088142 A1 | 4/2009 | Baribault |
| 2009/0247130 A1* | 10/2009 | Kokubo ........................ 455/411 |
| 2009/0264138 A1* | 10/2009 | Kang et al. .................... 455/466 |
| 2009/0292710 A1 | 11/2009 | Casey |
| 2009/0307333 A1* | 12/2009 | Welingkar et al. ............ 709/219 |
| 2010/0094996 A1* | 4/2010 | Samaha ........................ 709/224 |

OTHER PUBLICATIONS

Fidelithon Systems, LLC, Supplementary European Search Report for European patent Application No. 11792952.1-1957 / 2580675 PCT/US2011/039266, European Patent Office; 8 pages.

* cited by examiner

SMARTPHONE MANAGEMENT SYSTEM AND METHOD

CROSS-REFERENCE TO RELATED APPLICATIONS

This application claims priority to U.S. Provisional Patent Application Ser. No. 61/353,769 entitled "Smartphone Management System and Method," filed on 11 Jun. 2010, the disclosure of which is incorporated herein by reference in its entirety.

TECHNICAL FIELD

The present invention relates generally to mobile devices, and more particularly to managing files on a mobile device in a cloud computing environment.

BACKGROUND

Cloud computing is a growing trend in the information technology industry. Several aspects of cloud computing are emerging, like the ability to offer infrastructure and services to businesses remotely without significant investments by those businesses and the ability to host, not just fixed websites or some fixed service, but to enable innovation and new business models and creativity on many different Operating Systems (OS) and levels of computer hardware, which is user selectable at the time of deployment and allocate dedicated physical memory, CPU and disk drives. These are deployed in an on-demand basis.

Smartphone applications and the ability to download applications into a multifunction handheld smartphone and make the smartphone an application specific device for use anywhere is a growing trend. Digital data generation is growing and management, search and backup of this digital data is becoming a significant challenge across multiple platforms ((PC, iPhone, iPOD/MP3, Gaming platforms (Wii, DSi, PS3, xBox)). Sharing of information and social networking is an important feature for modern Gen-X plus consumers. Social media companies such as Facebook, MySpace, Linkedin, Twitter, QQ (www.qq.com), and Renren (www.renren) are driving this trend. Media storage and network-attached storage (NAS) for data storage and retrieval have also grown rapidly with the increased amount of text data, graphic data, video data, and large software applications.

Accordingly, it is desirable to have a system and method that provides a smartphone management service in a cloud computing environment.

SUMMARY OF THE INVENTION

The present invention provides a mobile device management system, method, and article of manufacture for managing files that are locally generated or stored on the mobile device in a cloud environment. The mobile device is configured with a phone application module, a menu module, and a web browser module to conduct a backup operation of the files on the mobile device to a cloud through a network. The cloud comprises a web server, an authentication server, and a secure storage for authenticating the mobile user's access to the cloud and provide a secure connection to backup the files from the mobile device to the secure storage of the cloud. In some embodiments, the mobile device can also upload the files from the mobile device to the secure storage of the cloud, which alleviates the burden of carrying a large amount of files on the file storage of the mobile device. In the upload operation, the mobile device deletes the files that have been uploaded to the cloud.

The secure storage of the cloud maintains a replicate copy of the files from the mobile device after executing a backup operation or an upload operation. This allows the user to restore files, which have been previously backed up or uploaded from the mobile device to the cloud, in the event that the mobile device is lost, stolen, or damaged. The user is able to purchase a second mobile device, access the cloud, and restore the user's files from the secure storage of the cloud to a file storage on the second mobile device.

The replicate copy of the user's file on the secure storage of the cloud also provides a central location in which a user is able to access the files from another station, such as a computer, a SmartAuto, a SmartTV, and other computing resources. The SmartAuto is an automobile which is equipped with an on-board display screen to access a network, or a telecommunication slot to hold a portable device for accessing the network through the mobile device. Various types of portable devices are operable with the SmartAuto including a mobile phone, a smartphone, a music player, or a tablet computer. The SmartTV accesses the user's files on the secure storage of the cloud through either a web browser or a phone application module.

In some embodiments where the mobile device operates in the cloud environment, the application module of the mobile device enables the user to share selected files or data with other authorized users within a company's service and/or through social networking sites.

In some embodiments, the user would select to share what data to share with which person by the user's selections through either the phone application module on the mobile device, the menu module of the phone device, or a web application on the web server. The user's personal authorized network of friends can access and download the data provided by the user, as well as receiving an update when new data become available from the user.

Broadly stated, a computer-implemented method for managing files on a mobile device, comprises determining if an upload calculation value on the mobile device is greater than or equal to a predetermined upload parameter; if the upload calculation value is greater than or equal to the predetermined upload parameter, executing an upload operation in uploading files from the mobile device to a secure storage on a cloud provider; and upon successful completion of the upload operation, deleting the files on the mobile device that has been uploaded to the secure storage on the cloud.

Advantageously, the present invention provides the user with the comfort level knowing that if the user's mobile device is lost or damaged, there is recourse in which the user is able to restore the files from the cloud onto a new mobile device or a repaired mobile device. The present invention further provides the user with the ability to move or offload a significant amount of files from the mobile device to the cloud, thereby freeing up additional memory capacity on the mobile device.

The structures and methods of the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The invention will be described with respect to specific embodiments thereof, and reference will be made to the drawings, in which.

DETAILED DESCRIPTION

A description of structural embodiments and methods of the present invention is provided with reference to FIGS. 1-7. It is to be understood that there is no intention to limit the invention to the specifically disclosed embodiments but that the invention may be practiced using other features, elements, methods and embodiments. Like elements in various embodiments are commonly referred to with like reference numerals.

The following definitions may apply to some of the elements described with regard to some embodiments of the invention. These terms may likewise be expanded upon herein.

Cloud Computing—Internet-based computing network that involves the provision of dynamically scalable and often virtualized resources as a service over the Internet, such as iCloud® available from Apple Inc. of Cupertino, Calif., Amazon Web Services (IaaS) and Elastic Compute Cloud (EC2) available from Amazon.com, Inc. of Seattle, Wash., SaaS and PaaS available from Google Inc. of Mountain View, Calif., Microsoft Azure Service Platform (Paas) available from Microsoft Corporation of Redmond, Wash., Sun Open Cloud Platform available from Oracle Corporation of Redwood City, Calif., and other cloud computing service providers.

Files—any types of electronic information including data, text files, graphic files, music files, video files, e-mails, personal profiles, social networking profiles, software applications, and operating systems.

Mobile Device—a portable device (including a smartphone like iPhones, a mobile phone, a mobile device like iPods, a tablet computer like iPads, and a browser-based notebook computer like Chromebooks) with a processor, a memory, a screen, with connection capabilities of Wireless Local Area Network (WLAN) and Wide Area Network (WAN). The mobile phone is configured with a full or partial operating system (OS) software which provides a platform for running basic and advanced software applications.

SmartAuto—an auto vehicle with a processor, a memory, a screen, with connection capabilities of Wireless Local Area Network (WLAN) and Wide Area Network (WAN), or an auto vehicle with a telecommunication slot connectable to a mobile device like iPods, iPhones, and iPads.

SmartTV—a television system having a telecommunication medium for transmitting and receiving moving video images (either monochromatic or color), still images and sound. The television system operates as a television, a computer, an entertainment center, and a storage device. The telecommunication medium of the television system includes a television set, television programming, television transmission, cable programming, cable transmission, satellite programming, satellite transmission, Internet programming, and Internet transmission.

Social Networking—a social structure composed of individuals or organizations, which are also referred to as nodes, that are connected by one or more specific types of interdependency, such as friendship, professional profiles, financial exchange, common interest, kinship, relationships, beliefs, knowledge, prestige, dislike, or sexual relationships. Some current examples of social networking sites may include Facebook, Linkedin, Twitter, Yelp, Orkut, Google's Social Circle, 腾讯 (www.qq.com), 人人网 (www.renren.com), 新浪微博 (www.weibo.com), 搜狐 (www.sohu.com), Hyves, Nexopia, Skyrock, StudiVZ, and Tuenti.

Web Browser—a software application for retrieving, presenting, and traversing a Uniform Resource Identifier (URI) on the World Wide Web provided by web severs. A web browser may include, but is not limited to, browsers running on personal computer operating systems and browsers running on mobile phone platforms. The first type of web browsers may include Microsoft's Internet Explorer, Apple's Safari, Google's Chrome, and Mozilla's Firefox. The second type of web browsers may include the iPhone OS, Google Android, Nokia S60 and Palm WebOS. Examples of a URI include a web page, an image, a video, or other type of content.

Figure 1:
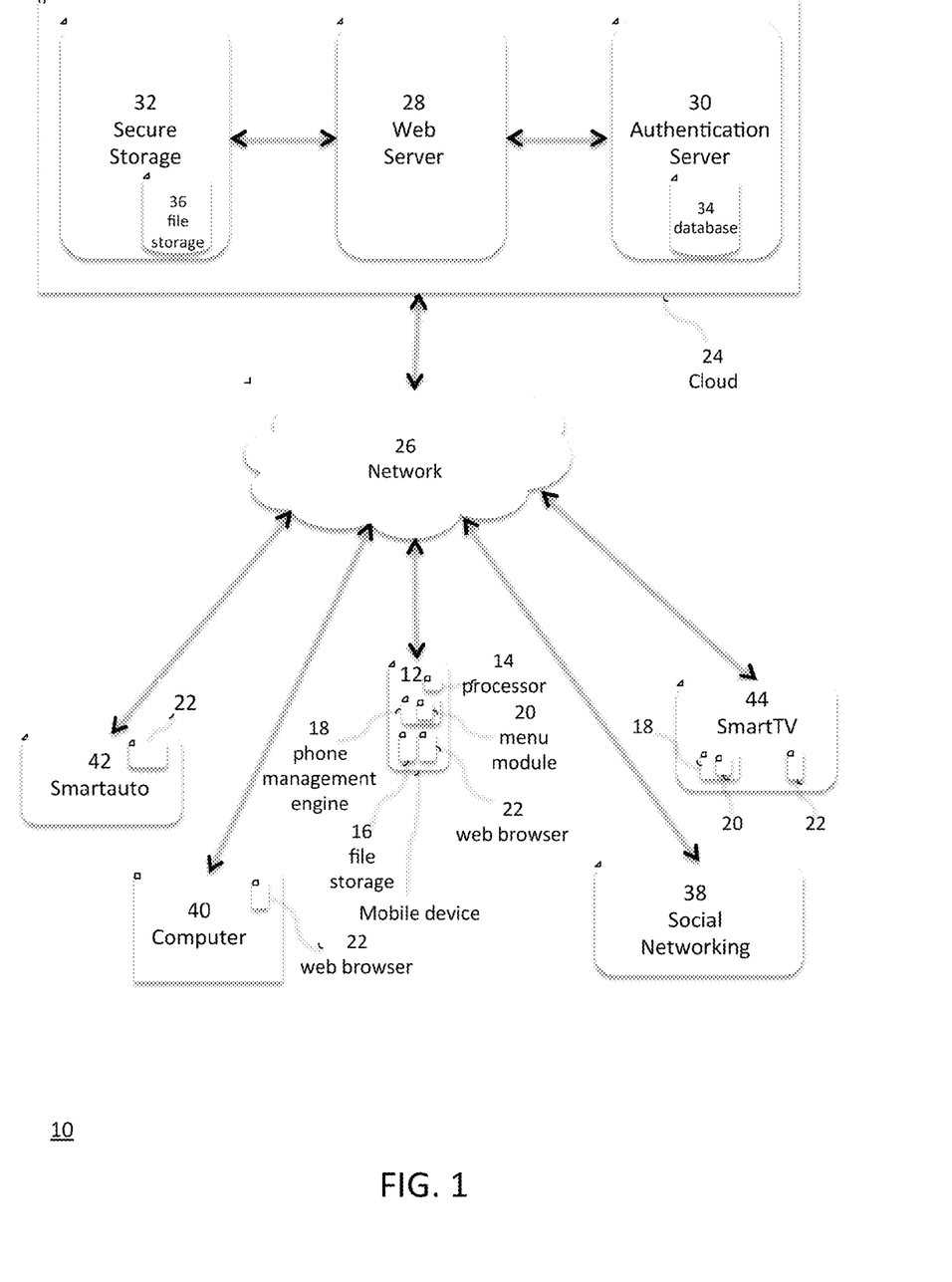
FIG. 1 is a block diagram illustrating a smartphone management system in accordance with the present invention.

Referring now to FIG. 1, there is shown a system diagram illustrating a smartphone management system 10 for managing files on a mobile device (also referred to as "smartphone") 12. The smartphone management system 10 builds on cloud computing models and enables end users of the system technology to locally generate data on their smartphone and harvest existing data. The mobile device 12 includes a processor 14, a file storage 16, and other components not explicitly shown, such as a memory, and an operating system that controls the processor 14. The mobile device 12 is loaded with several software modules, including a phone management engine 18, a main menu (also referred to as "menu module") 20 that is part of the phone management engine 18, and a web browser 22. These software modules, software applications, and the operating system reside on the memory of the mobile device 12. The processor 14 on the mobile device 12 executes a software module, either the phone management engine 18, a selection on the main menu 20 or the web browser 22, to access a cloud (also referred to as a cloud infrastructure or a server infrastructure) 24 through a network 26 for uploading files from the mobile device 12 to the cloud 24, or download the files from the cloud infrastructure 24 to the mobile device 12. A user of the mobile device 12 is able to generate data locally on the mobile device 12, and push user generated files up to the cloud infrastructure 24, or download files from the cloud 24 to the mobile device 12. The term "files" is interpreted broadly, but is not limited to any type of electronic information including data, text files, graphic files, music files, video files, e-mail, personal profile, social networking profiles, software applications, and operating systems. The network 26 can be implemented a wireless network, a wired network protocol or any suitable communication protocols, such as 3 G (3rd generation mobile telecommunications), 4G, (fourth-generation of cellular wireless standards), long term evolution (LTE), a wide area network (WAN), Wi-Fi™ like wireless local area network (WLAN) 802.11n, or a local area network (LAN) connection (internetwork—connected to either WAN or LAN), Ethernet, Bluebooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol and other types of networks like a satellite, a cable network, or an optical network set-top boxes (STBs).

In this embodiment, the cloud 24 comprises a web server 28, an authentication server 30, and a secure storage 32. The web server 28 is coupled to an authentication server 30 for authenticating whether a user of the mobile device 12 has been registered or not with the web server 28. If the user of the mobile device 12, through the phone management engine 18 or the web browser 22, enters personal login information and credentials into the web server 28, and the authentication server 30 authenticates that the personal login information matches with a database 34 in the authentication server 30, then the authentication server 30 grants permission for the user to access the web server 28 and the secure storage 32. The authentication server 30 may employ a variety of authentication protocols to authenticate the user, such as a Transport Layer Security (TLS) or Secure Socket Layer (SSL), which are cryptographic protocols that provide security for communications over networks like the Internet.

After the user of the mobile device has been authenticated by the authentication server 30 in which a secure connection has been established, the user accesses the users' files in the file storage 36 of the secure storage 32. The mobile device 12 communicates with the secure storage 32 through the network 26 and the web server 28. In an upload operation, the user uploads the user's information to the secure storage 32 through an established secure connection. In a download operation, the user downloads the user's information obtained from the users' files in the secure storage 32. The data on the mobile device 12 is able to seamlessly and securely back up to the cloud infrastructure 24. The data then appears to be available and accessible from the mobile device 12, and the user of the mobile device 12 is able to the access to the data from anywhere that has the network 26 in the surrounding area.

The cloud infrastructure 24 is coupled to a social networking site 38 through the network 26. The user of the mobile device 12 is able, if elected to do so, to share selected data with other authorized users or names on the user's contact list on the social networking site 38 if the user enables on his or her account via a web management application or the phone application 18. The mobile device 12, through the cloud 24, is able to link to one or more of the social networking sites 38, such as Facebook, MySpace, Twitter, Linkedin and other social networking sites when the user of the mobile device 12 has provided user's personal authorized network of friends being informed of new data available on the cloud 24 and have the ability to access and download. When another user on social network has established him or her as an authorized user or a name in the contact list (which is also referred to as "per cell" sharing), the user is able to send a message or inform, either automatically or deliberately, the user on the social networking that the user has updated personal contact information, such as an updated employer, or added new data or file, such as a photo. The user can set a security setting as to each file, or a collection of files, to be shared with a particular user on social networking or "in-app" users (those that have already established an account using the same app). This enables a specific network of people to view and download specific data types, like a specific contact or photo.

Optionally, the web server 28 provides a management control panel to enable "Pro" users to manage more phones, be able to track phones GPS locations, reset passwords and lock out phones if needed. This function is aimed for business administrators that would like to track usage and be able to manage and restore phones or disable phones if needed.

The smart phone management system 10 may provide high performance sharing of data that appears like a single integrated disk store. Comparing to home web servers, or home based NAS boxes, the smart phone management system 10 may provide faster access times due to the non-symmetrical nature of the data access. When placing large amounts of data on to the cloud 24, these tasks can be queued in the background and or done at off peak scheduled times. Once an initial backup is done, the additional backup can be executed as incremental differences between the last backup and the new files added to the mobile device 12.

A computer 40 provides an additional platform for accessing the cloud 24 through the network 26. The computer 40 is loaded with the web browser 22 for accessing the web server 28 in the cloud 24. A user is able to login to the web server 28 by using the web browser 22 in the computer 40 to access the user information stored in the secure storage 32 of the cloud, and is able to select preferences to share the user information with other users. The computer 40 can be a desktop computer, a notebook computer, a tablet computer, or a portable device with a processor.

A SmartAuto 42 provides another platform for accessing the cloud 24 through the network 26. The SmartAuto 42 accesses the web server 28 through either a bluetooth and WAN network on the mobile device 12 in the car, or a dedicated WAN vehicle connection directly.

A SmartTV 44 provides an alternative platform for accessing the cloud 24 through the network 26. The SmartTV 44 accesses the web server through either the phone management engine 18 or the web browser 22.

The phone management engine 18 handles user data gathering, organizing, and uploading to servers 28, 30, 32, for enabling future sharing and phone data recovery. The functions provided by the phone application software 18 includes, but is not limited to, the features described below.

Upload data/files—The processor 14 uploads data and files from the mobile device 12 to free up memory space. The user still sees the files in a virtual environment. The files that are uploaded require longer access times to re-download and retrieve to view or play back locally. In some cases, viewing may not require all the data to be downloaded, just meta data.

Download data/files—The processor 14 downloads files from the cloud 24 concerning the files that the user wants to have local or available without internetwork connection. This function consumes local disk storage space on the mobile device 12.

Back up data/files (also referred to as a "mirror image" of the files)—The processor 14 backs up user-selected files to the cloud back-up service in the secure storage 32. This ensures that user's data can be recovered if the mobile device 12 is lost, damaged, or stolen.

Restore data/files—The processor 14 executes a restore operation on the menu module 20 to enable a user to re-image the mobile device 12 with their personalized data. Some of the restored files include SMS, MMS, photos, videos, and MP3s. The restore operation can be either a complete restore, or a partial restore, depending on a user's preference.

View files—A user can view data/files by accessing one of the tabs on a main menu module stored on either (1) phone secure digital (SD) or built-in flash non-removable memory, (2) phone SD card or removable media storage, or (3) the file storage 36 of the secure storage 32 on the cloud 24.

Schedule—The user can use this feature to do off-peak back-ups, which include recommendations on connectivity and power optimizations.

Administrator—All the user definable settings are contained in this function.

Zap—This feature enables the mobile device 12 to be remotely disabled and data deleted.

A server application software in the authentication server 30 handles user login and authentication, allocating storage and organizing retrieval of images, provides links to sharing with networked friends, or social networked friends. The server application software provides the following functions: (1) SSL based user Login, (2) viewing stored files, both local and remote files, (3) changing the password for phone to access files, (4) administering pro version settings (more phones, "zap" function), (5) auto off-load scheduling, and (6) GPS tracking The secure storage 32 provides SSL encrypted secure storage of users' data as well as a seamless cloud of information. The secure storage 32 has the file storage 36 for storing all of the user files on the mobile device 12.

Figure 2:
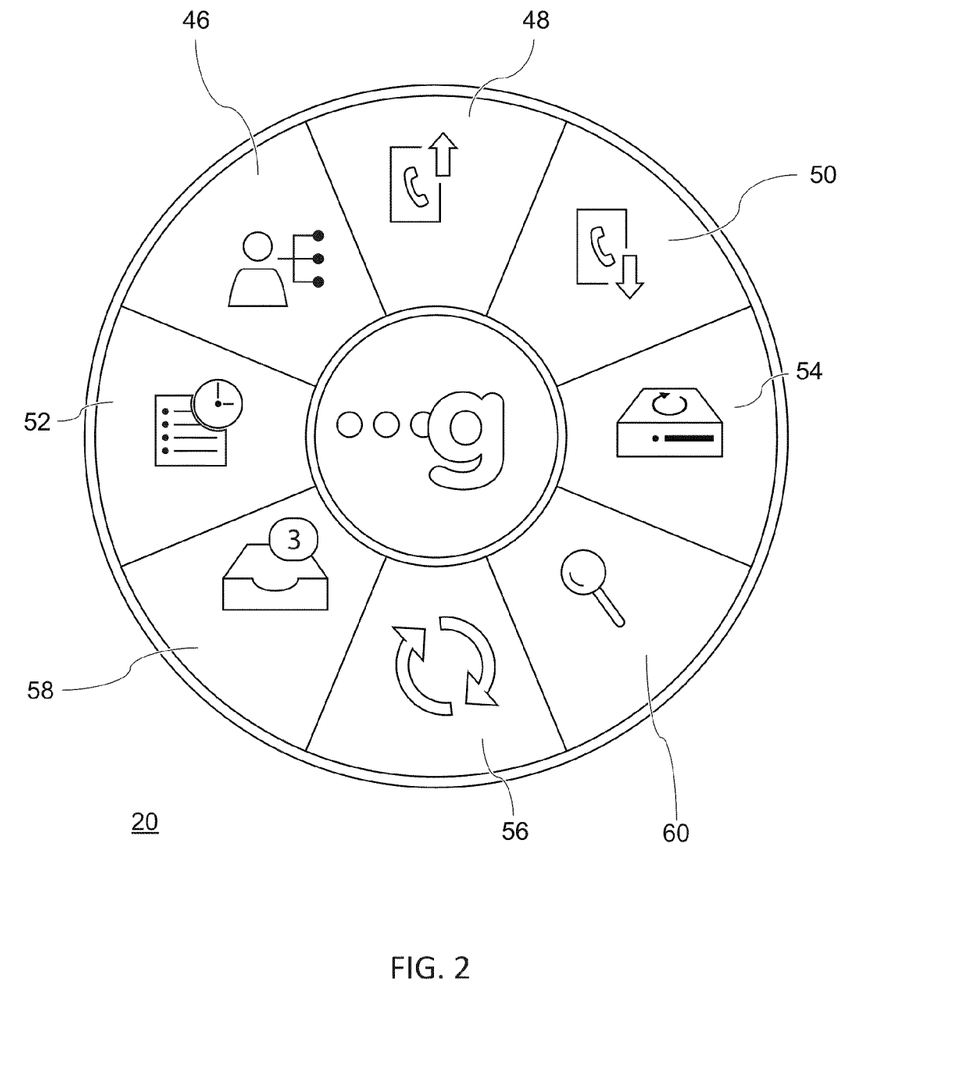
FIG. 2 is a graphical diagram illustrating one embodiment of a menu module implemented with a wheel in accordance with the present invention.

In FIG. 2, there is shown a graphical diagram illustrating one embodiment of the main menu 20 implemented with a wheel. The wheel 20 composes a plurality of sector tabs 46, 48, 50, 52, 54, 56, 58, 60. Some of the tabs in the wheel 20 correspond with software programming modules as described with respect to FIG. 3. The sector tab 46 of the wheel 20 allows a user to administer the accessing and sharing of files, such as setting passwords, approving other users to view files, activate location-based services, and others. When the user desires to upload his or her files from the file storage 16, the user activates the sector tab 48 to initiate the upload operation of files from the mobile device 12 to the cloud 24. When the user desires to download his or her files from the file storage 36, the user activates the sector tab 50 to initiate the download operation of files from the secure storage 32 of the cloud 24 to the file storage 16 of the mobile device 12. The user can schedule in advance when to perform a backup of the file storage 16, and the frequency of backups from the mobile device 12 through the sector tab 52. The user can also initiate a backup operation of the file storage 16 on the mobile device 12 onto the secure storage 32 of the cloud 24 by activating the section tab 54.

If the user lost his or her mobile device 12, the user can purchase another mobile phone, load the phone management engine 18, and select a sector tab 56 to perform a complete restore of the user files stored on the file storage 36 of the secure storage 32 of the cloud 24 to the new mobile phone. The sector tab 58 on the wheel 16 is a notification function in the mobile device 12 sends a notification to authorized users or users on the contact list when the user has updated his or her profile, and when the user has added more information on a social networking site, e.g., sharing a new photo, or notifications related to the users account, such as exceeding storage or transaction limits. The user is able to view files on the mobile device 12, or view files on the secure storage 32 of the cloud 24, by selecting the sector tab 60 (also referring to as a viewing module 60).

Other embodiments of the main menu 20 can be practiced without departing from the spirits of the present invention. For example, the main menu 20 comprises an in-box which notifies each user when he or she receives information from other users.

Figure 3:
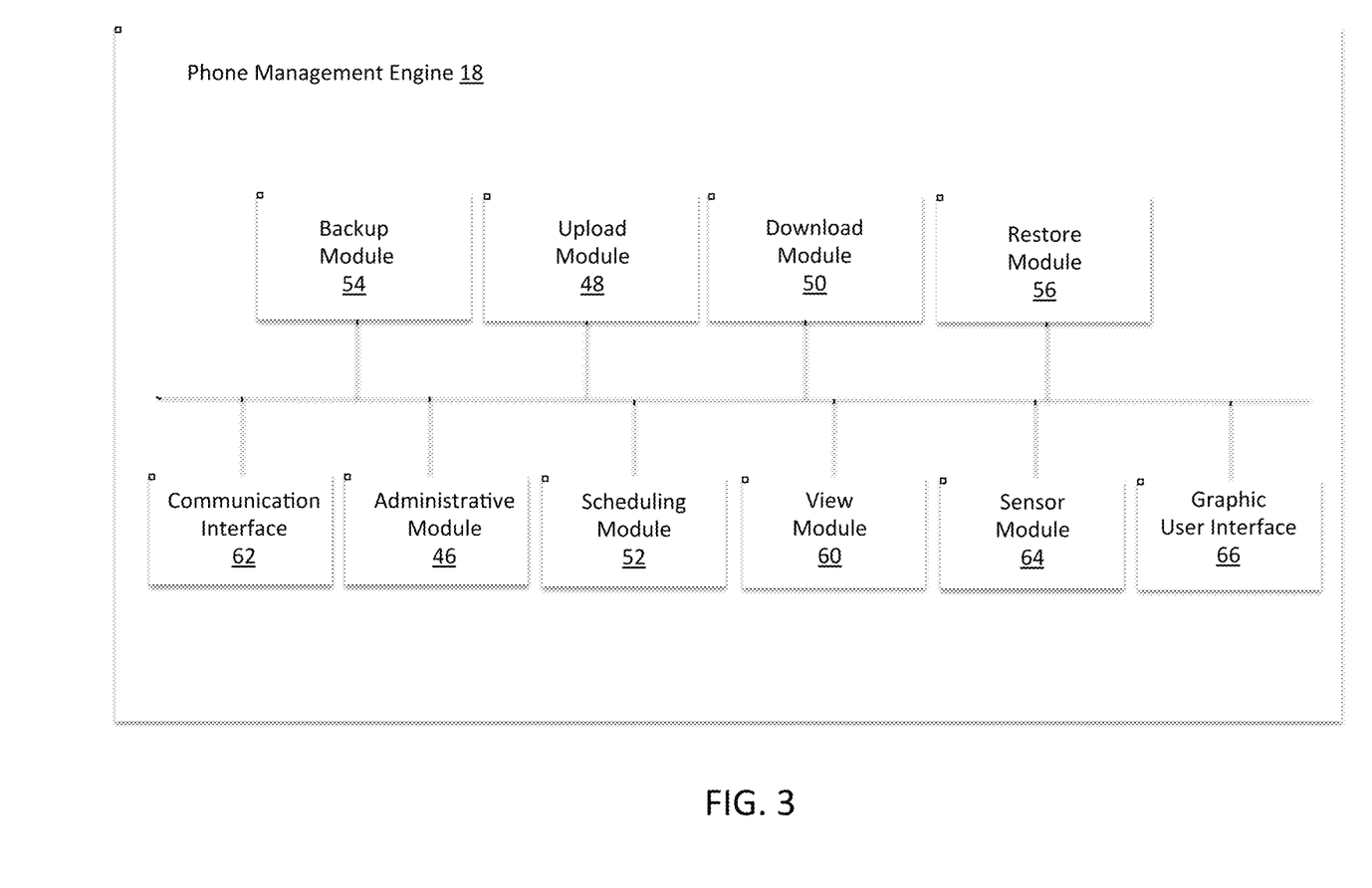
FIG. 3 is a simplified block diagram illustrating the phone management engine in accordance with the present invention.

FIG. 3 is a simplified block diagram illustrating the phone management engine 18. A communication interface 62 is provided in association with the phone management engine 18 for sending files from the mobile device 12 to the cloud 24 and receiving files from the cloud 24 to the mobile device 12.

The backup module 54 is provided in association with the phone management engine 18 for backing up files from the file storage 16 of the mobile device 12 to the file storage 36 of the secure storage 32 in the cloud 24. The user of the mobile device 12 has various options in selecting which types of file backup to perform, such as selecting to execute a full backup, selecting to execute an incremental backup, or selecting to execute a snapshot backup.

The upload module 48 is also provided in association with the phone management engine 18 for uploading files from the file storage 16 of the mobile device 12 to the file storage 36 of the secure storage 32 in the cloud 24. Upon completion of the uploading the files, the upload module 48 remove the files that have been uploaded from the mobile device 12 to the cloud 24, thereby freeing up more memory space in the file storage 16 of the mobile device 12.

The restore module 56 is further provided in association with the phone management engine 18 for restoring the user's files from the file storage 36 of the secure storage 32 of the cloud to the file storage 16 to the file storage of another mobile device (or could also be the same mobile device 12 in which the defective file storage 16 has been repaired). For example, if the user accidentally lost his or her mobile device 12, the user is able to purchase another new mobile phone and restore the user's files from the cloud 24 to the new mobile phone. The restore module 56 may be utilized to conduct a complete restore operation, or a partial restore operation.

A sensor module 64 may be utilized by the user in association with the phone management system 18 for providing GPS (Global Positioning System) functions. In one embodiment, the sensor module 64 is used to send a location information of the mobile device 12 to the cloud 24. The cloud 24 may have different sets of servers located at different locations across the world. Depending on the user's current location, the cloud 24 may suggest the closest web server 28, the closest authentication server 30, and the closest secure storage 32 to the mobile device 12 for fast communication between the mobile device 12 and the cloud 24.

A graphic user interface 66 may be associated with the phone management engine 18. The graphic user interface 66 may generate a display, such as the main menu 20, for displaying information on the screen of the mobile device 12 to the user.

Although the phone management engine 18 is characterized as a software engine for executing various software modules in one embodiment, including the administrative module 46, the upload module 48, the download module 50, the scheduling module 52, the backup module 54, the restore module 56, the viewing module 60, the communication interface 62, the sensor module 64, and the graphic user interface 66, the phone management engine 18 can also be applied to other embodiments and applications, such as a tablet computer, a watch, an automobile, and a television.

For example, in a tablet embodiment (a tablet personal computer, a tablet PC, or a portable tablet PC), the phone management engine 18 may be characterized as a tablet management engine, which comprises the administrative module 46, the upload module 48, the download module 50, the scheduling module 52, the backup module 54, the restore module 56, the viewing module 60, the communication interface 62, the sensor module 64, and the graphic user interface 66. The functional operations of these modules are similar to the phone management engine 18. In some embodiments, as described above with respect to the mobile device 12, the tablet includes the processor 14, the file storage 16, the phone management engine 18, the menu module 20, and the web browser 22. The tablet may be implemented with a touchscreen that serves as an input device for making a menu selection, entering alphanumeric, or writing kanji into the tablet.

In another example of a watch embodiment, the watch comprises most or all of the elements in the mobile device 12, the processor 14, the memory 16, the watch management engine 18 (instead of the phone management engine 18), the menu module 20, and the web browser 22. The watch can serve several important functions, such as taking photos with a camera on the watch, video recording with the camera, audio recording with a microphone on the watch, and a mobile storage location with a large memory capacity on the watch. The watch comprises most or all of the modules in the phone management engine 18, the administrative module 46, an upload module 48, the download module 50, the scheduling module 52, the backup module 54, the restore module 56, the viewing module 60, the communication interface 62, the sensor module 64, and the graphic user interface 66.

Figure 4:
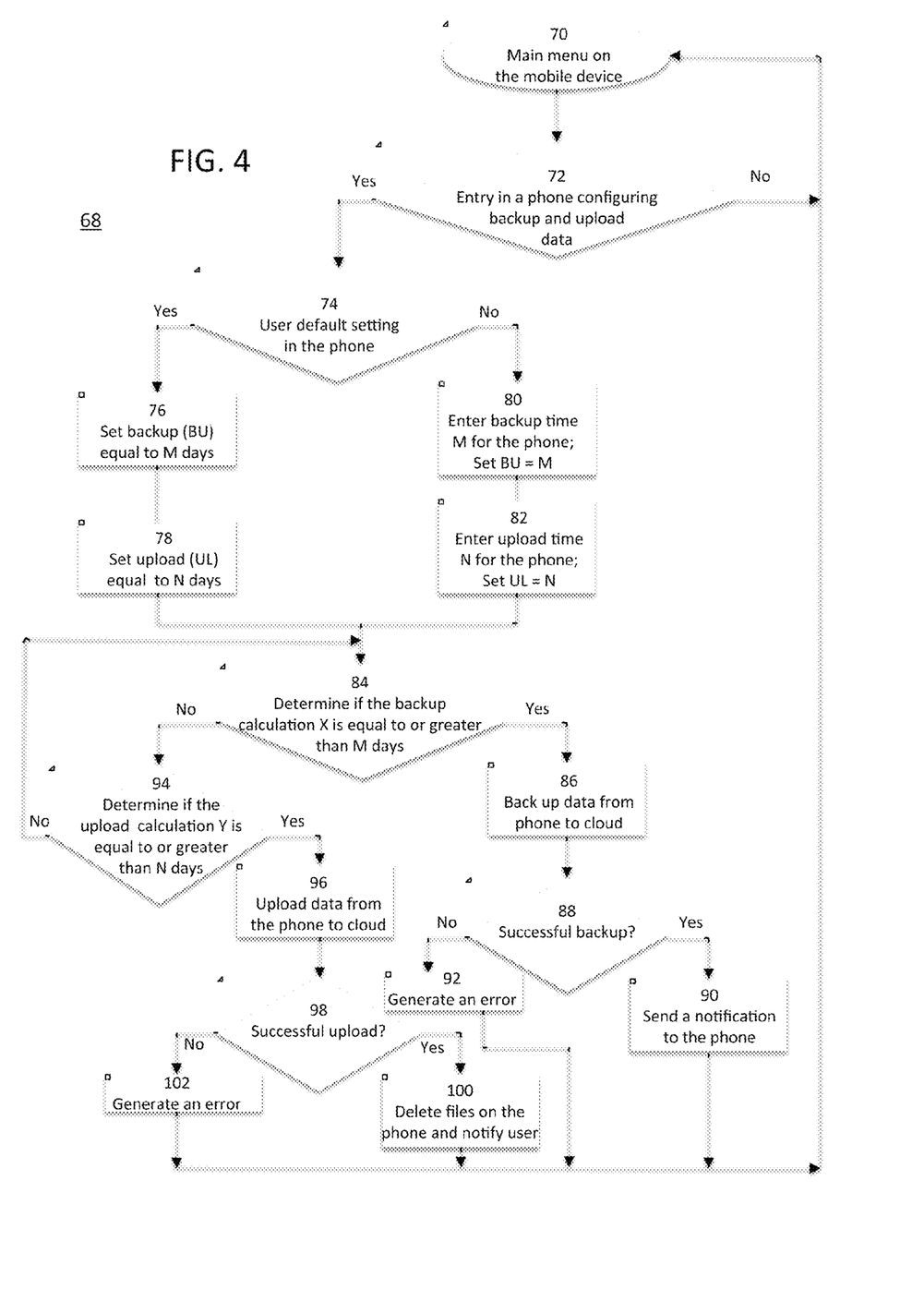
FIG. 4 is a simplified flow diagram illustrating an operational process for executing a backup operation and an upload operation in the smartphone management system.

Turning now to FIG. 4, there is shown a simplified flow diagram. illustrating an operational process 68 for executing a backup operation and an upload operation in the smartphone management system. At step 70, the mobile device 12 is turned ON and, after a secure log-in, displays the main menu 20 on the mobile device 12. At step 72, when the user of the mobile device 12 makes no entry in the mobile device 12 to configure or upload files, the process 68 remains at step 70 to display the main menu 20. When the user of the mobile device 12 makes an entry, which is to either perform a backup operation or an upload operation, the process 68 proceeds to step 74. At step 74, the processor 14 of the mobile device 12 determines whether the user has made a default setting for backup and upload operations. In a scenario where the user has made a default setting as to when to execute a backup operation, at step 76, the processor of the mobile device 12 sets a backup parameter (BU) to M number of days. The symbol M represents the default setting that the user has previously entered as to when to make a backup copy of the files on the mobile device 12 to the secure storage 32 on the cloud 24, e.g. backup the files every 7 days. Although the symbol M in this example is defined as the number of days, the timing of the backup can also be set in other time units, such as by hours, by week, and other time units. At step 78, the processor of the mobile device 12 sets an upload parameter (UL) to N number of days. The symbol N represents the default setting that the user has previously entered as to when to upload the files on the mobile device 12 to the secure storage 32 on the cloud 24, e.g., backup the files every 7 days. Although the symbol N in this example is defined as the number of days, the timing of the upload can also be set in other time units, such as by hours, by week, by a ratio of available memory capacity on the file storage of the mobile device 12, and other time units.

In a scenario where the user has not made a default setting as to when to execute a backup operation, at step 80, the user of the mobile device 12 enters a backup time M as to when to execute a backup operation to make a backup copy of the files from the mobile device 12 to the secure storage 32 on the cloud 24. The processor 14 of the mobile device 12 sets a backup parameter, BU, to M number of days. Although the symbol M in this example is defined as the number of days, the timing of the backup can also be set in other time units, such as by hours, by week, and other time units. At step 82, the user of the mobile device 12 enters an upload time N as to when to execute an upload operation to upload the files on the mobile device 12 to the secure storage 32 on the cloud 24, e.g. backup the files every 7 days. The processor 14 of the mobile device 12 sets an upload parameter, UL, to N number of days. Although the symbol N in this example is defined as the number of days, the timing of the backup can also be set in other time units, such as by hours, by week, by a ratio of available memory capacity on the file storage of the mobile device 12, and other time units.

At step 84, the process 68 of the mobile device 12 determines whether a backup calculation X is equal to or greater than the M parameter as set forth in a previous step. If the backup calculation X is determined to be equal to or greater than the M parameter, at step 86, the processor 14 of the mobile device 12 executes a backup operation of the files from the file storage 16 to the file storage 36 of the secure storage 32 in the cloud 24. One purpose of backing up the files of the mobile device 12 is to give the user a location to safely store the user's files in the event that the user lost his or her phone. In such instance, the user is able to restore the backup files from the file storage 36 of the secure storage 32 in the cloud 24 to a new mobile device. Another useful purpose for backing up the files of the mobile device 12 and storing the files on the cloud 24 provides the user alternate methods to access the same files on the mobile device 12, such as using the computer 40, the SmartAuto 42, or SmartTV 44 to access the file storage 36 on the secure storage 32. At step 88, the processor 14 of the mobile device 12 determines whether the backup operation has been successfully completed. If the processor 14 of the mobile device 12 successfully executes the backup operation, at step 90, the processor 14 sends a notification message to the user of the mobile device 12 to inform the user that the backup operation has been successfully completed. However, if the backup operation is halted for whatever reason, at step 92, the processor 14 sends an error message to the user of the mobile device 12 to inform the user that there was an error that occurred during the backup operation. In either step 90 or step 92, the process 62 returns to the main menu at step 70.

At step 84, if the processor 14 of the mobile device 12 determines whether a backup calculation X is neither equal to nor greater than the M parameter, the process 68 continues to step 94. At step 94, the processor 14 determines if the upload calculation Y is equal to or greater than the N parameter. If the upload calculation Y is equal to or greater than the N parameter, at step 96, the processor 14 executes an upload operation by uploading files from the file storage 16 of the mobile device 12 to the file storage 36 of the secure storage 32 in the cloud 24. At step 98, the processor 14 determines whether the load operation has been successfully completed. At step 100, if the load operation has been completed successfully, the processor 14 deletes files in the file storage 16 of the mobile device 12 so as to relieve the burden of consuming the memory capacity on the mobile device 12. The processor 14 also sends a notification message to the user informing the user that the upload operation has been completed successfully. However, if the upload operation was halted for whatever reason, at step 102, the processor 14 generates an error message to the user informing the user that an error had occurred while conducting the upload operation. In either step 100 or 102, the process 68 returns to the main menu at step 70.

In this embodiment, at step 94, if the processor 14 determines that the upload calculation Y is neither equal to nor greater than the N parameter, the process 68 returns to the step 84. In an alternative embodiment, an optional watchdog timer is inserted to set a specified amount of time for the process 68 to be in the loop until the process 68 exits and returns to the main menu at step 70. Otherwise, without the watchdog timer, it is conceivable that the process 68 remains in the loop between steps 84 and 94 for a long time, or even indefinitely, without exiting this loop.

Figure 5:
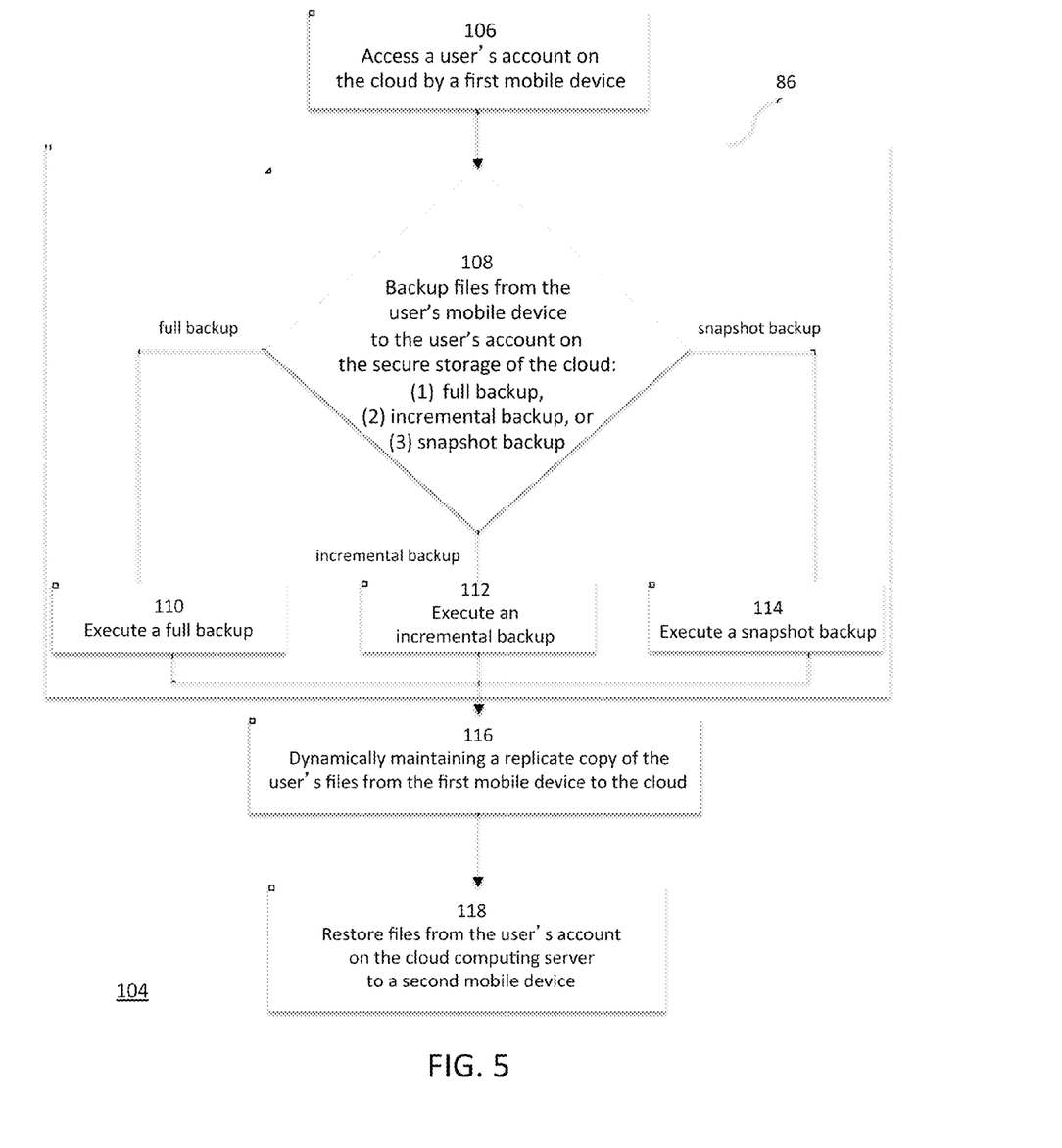
FIG. 5 is a simplified flow diagram illustrating an overall operational process in the smartphone management service in accordance with the present invention.

FIG. 5 is a simplified flow diagram illustrating an overall process flow 104 in the smartphone management. At step 106, the user of the mobile device 12 accesses the user's account on the cloud 24 through the network 26 after the user has been authenticated by the authentication server 30. At step 108, the processor 14 of the mobile device 12 initiates a backup operation to backup files from the user's mobile device 12 to the user's account on the secure storage 32 of the cloud 24, and selects one of the three backup options: (1) a full backup, (2) an incremental backup, or (3) a snapshot backup. With the first option, at step 110, the user of the mobile device 12 selects to execute a full backup of files from the file storage 16 on the mobile device 12 to the file storage on the secure storage 32 of the cloud 24. A user would typically elect to do a full backup the first time that the user is backing up files from the mobile device 12 to the cloud 24. After a full backup operation, the user subsequently may choose to do incremental backups to save the amount of time to backup the files from the mobile device 12 to the cloud 24. One type of incremental backup is to conduct backup of just the new files that have been added, which can be characterized as the difference between the new image and the old image, represented mathematically as delta $\Delta$=new image−old image. The delta can also be described as the new files that have been added since the last backup operation was conducted. The processor 14 can set a regular schedule interval to perform a full backup operation of the files from the mobile device 12 to the cloud 24.

With the second option, at step 112, the user of the mobile device 12 selects to execute an incremental backup of files from the file storage 16 on the mobile device 12 to the file storage 36 on the secure storage 32 of the cloud 24. With the third option, at step 114, the user of the mobile device 12 selects to execute a snapshot backup of the files from the file storage 16 on the mobile device 12 to the file storage on the secure storage 32 of the cloud 24.

Between the full backup 110 and the incremental backup 112, the user can also conduct the snapshot back operation 114. A user is able to take a snapshot of the files at the precise time that the snapshot was taken. The user may initiate a snapshot backup in various circumstances, such as when the phone management engine 18 detects that the file storage 16 is close to reaching the memory capacity, when the phone management engine 18 detects that a large amount of files have been added to the file storage 16, or the user sets a scheduled time and the frequency at which snapshot backups are taken.

At step 116, the secure storage 32 on the cloud 24 maintains dynamically a replicate copy of the user's file from the mobile device 12 to the cloud 24. In the event that the mobile device 12 is lost, stolen, or damaged, the user can buy a second mobile device to restore files, at step 118, from the user's account on the cloud to download user's backup files from the file storage 36 of the secure storage 32 on the cloud 24 to a file storage on the second mobile device.

Figure 6:
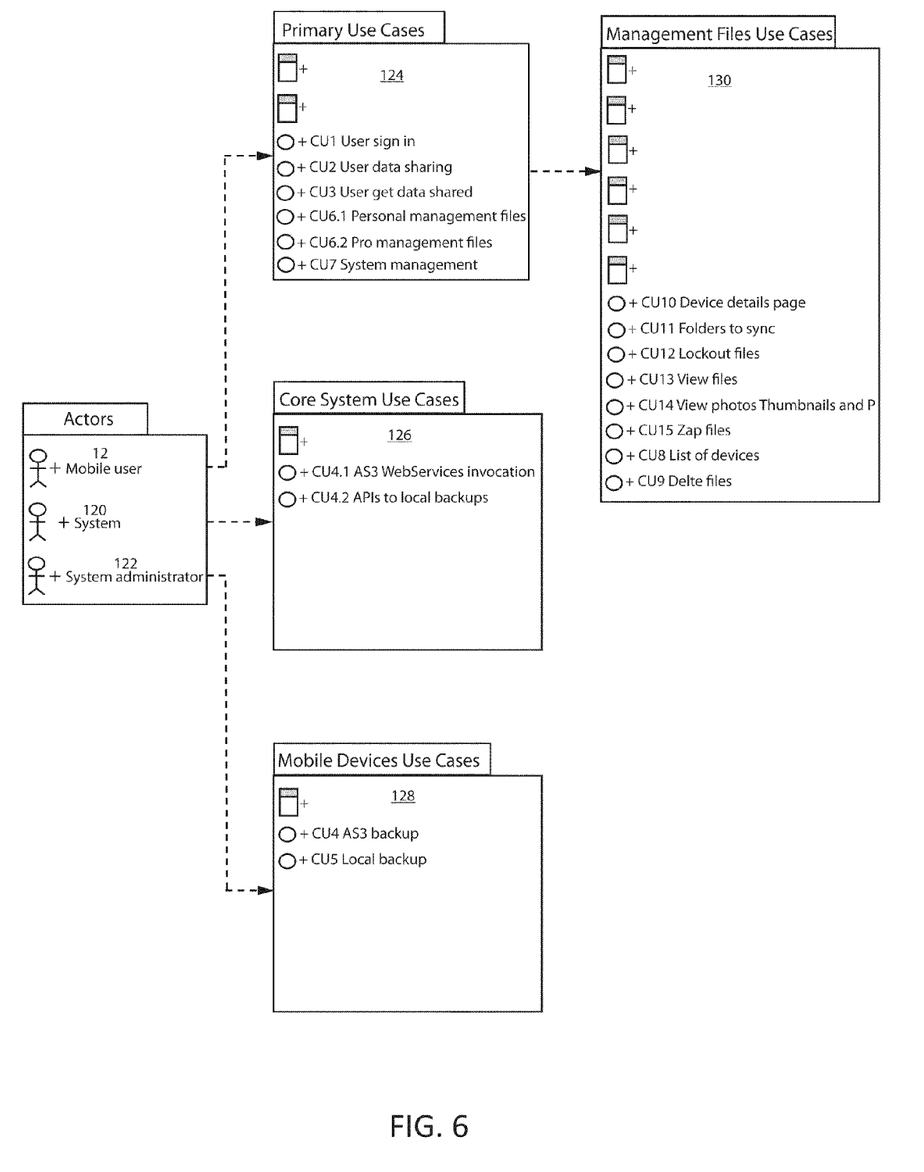
FIG. 6 is a graphical diagram illustrating exemplary use cases in accordance with the present invention.

FIG. 6 is a graphical diagram illustrating exemplary use cases. The exemplary use cases are executed using a cloud computing model and having the majority or the infrastructure hosted in the cloud infrastructure 24. A user of the mobile device 12 includes commercially available products like iPhone, Android, Blackberry, MeeGo or Windows Phone 7. A system 120 represents an application core. A system administrator 122 represents an application core administrator. Four types of use cases are illustrated below: primary use case 124, core system use cases 126, mobile device use cases 128, and management use cases 130.

Figure 7:
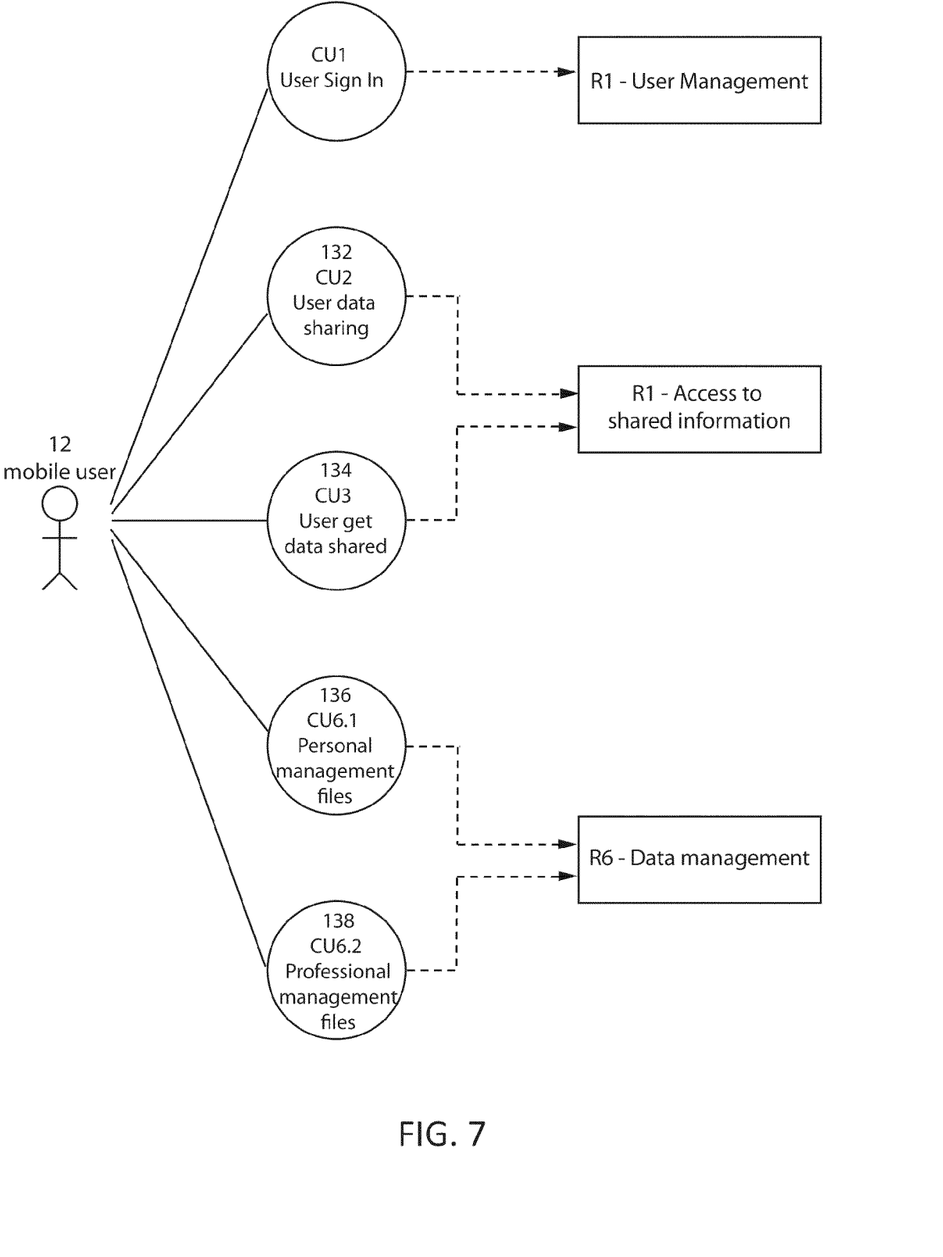
FIG. 7 is a graphical diagram illustrating primary use cases in accordance with the present invention.

FIG. 7 is a graphical diagram illustrating the primary use cases. At step 132, the user of the mobile device 12 signs in to the cloud 24. First, if a user information does not exist in the authentication server 30, the new user is redirected to the user registration web page. The new user is asked to enter the following data: first name, last name, email, new password, and confirm password, where a user type is defined when the user downloads the respective app from the app store. Second, if the user information does exist in the authentication server 30, the registered user enters the following data for the user to sign in: username (valid nickname or email), and password (valid password registered). The authentication server 30 on the cloud 24 validates that the user exits and the password is correct. Third, if the user name exists but the access is denied, the user has entered either an invalid nickname/email, or an invalid password. The authentication server 30 validates that the user name or the password is incorrect, and the dialogue box is attempted again. Fourth, where the user has forgotten his or her password, the authentication server 30 redirects the web page for sending a new password. The user would enter his or her email address, to which the authentication server would send a corresponding password associated with that particular user name.

At step 134, the user of the mobile device 12 selects to share files with other users from a company's service (or a provider's service) or social networking sites. At step 136, users with a "Personal" account manage their files. At step 138, users with a "Pro" account manage their files. At step 138, the web server 28 provides a management control panel to enable "pro" (or expert) users to manage more phones, be able to track phones' GPS locations, reset passwords and lock out phones if needed. This function is aimed for business administrators that would like to track usage and be able to manage and restore phones or disable phones or remotely erase data if needed.

Embodiments of the present invention are also applicable to other types of applications, such as game consoles, portable game machines. For example, the backup and download features can also be applied to makers of other systems (non-phone and non-PC) to enable better sharing and management of digital media beyond smartphones and users could link digital data downloaded or generated on game consoles or portable gaming systems.

Some portions of the above description describe the embodiments in terms of algorithmic descriptions and processes, e.g., as with the description within FIGS. 3-7. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor, for example, as described in FIGS. 3-7. Furthermore, it has also proven convenient at times, to refer to these arrangements of operations as modules, without loss of generality. The described operations and their associated modules may be embodied in software, firmware, hardware, or any combinations thereof.

The present invention has been described in particular detail with respect to possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. The system may be implemented via a combination of hardware and software, as described, or entirely in hardware elements, or entirely in software elements. The particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

As used herein, any reference to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is generally conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

In various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: mobile phones, personal digital assistants, smartphones, kiosks, desktop computers, laptop computers, tablet computers, browser-based computers, consumer electronic devices, automobiles, televisions, set-top boxes, watches or the like. An electronic device for implementing the present invention may use an operating system such as, for example, iOS available from Apple Inc. of Cupertino, Calif., Android available from Google Inc. of Mountain View, Calif., Microsoft Phone 7 available from Microsoft Corporation of Redmond, Wash., webOS available from Palm, Inc. of Sunnyvale, Calif., or, or any other operating system that is adapted for use on the device. In some embodiments, the electronic device for implementing the present invention includes functionality for communication over one or more networks, including for example a cellular telephone network, wireless network, and/or computer network such as the Internet.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

An ordinary artisan should require no additional explanation in developing the methods and systems described herein but may nevertheless find some possibly helpful guidance in the preparation of these methods and systems by examining standard reference works in the relevant art.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. The terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

What is claimed and desired to be secured by Letters Patent of the United States is:

1. A mobile system for managing information, comprising:
    a communication interface configured to send files from a processor of a smartphone to a secure storage on a cloud provider;
    a phone management engine having a menu with a plurality of modules, the plurality of modules having an upload module and an administrative module, the upload module configured by the processor to determining if an upload calculation value on the smartphone is greater than or equal to a predetermined upload parameter;
    if the upload calculation value is greater than or equal to the predetermined upload parameter, the upload module configured by the processor through a web browser to execute an upload operation in sending files from the smartphone directly to the secure storage on the cloud provider;
    upon successful completion of the upload operation, the upload module configured by the processor to delete the files on the smartphone that has been uploaded to the secure storage on the cloud; and
    an administrative module configured to enable a user of the smartphone to share via the cloud at least a portion of the files that have been uploaded to the secure storage with one or more other authorized users to view the uploaded files and activate a location-based devices;
    wherein prior to the determining step, comprises
    setting a default value for the predetermined upload parameter; and
    entering a value for the predetermined upload parameter if there is no default setting.

* * * * *